US010447045B2

(12) United States Patent
Morita (10) Patent No.: US 10,447,045 B2
(45) Date of Patent: Oct. 15, 2019

(54) POWER CONTROL DEVICE, POWER CONTROL METHOD, AND POWER CONTROL SYSTEM

(71) Applicant: Sony Corporation, Tokyo (JP)

(72) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 15/544,967

(22) PCT Filed: Dec. 22, 2015

(86) PCT No.: PCT/JP2015/085862
§ 371 (c)(1),
(2) Date: Jul. 20, 2017

(87) PCT Pub. No.: WO2016/121273
PCT Pub. Date: Aug. 4, 2016

(65) Prior Publication Data
US 2017/0373510 A1    Dec. 28, 2017

(30) Foreign Application Priority Data

Jan. 30, 2015 (JP) ................................ 2015-017542

(51) Int. Cl.
*H02J 7/00* (2006.01)
*H02M 3/335* (2006.01)
(Continued)

(52) U.S. Cl.
CPC .............. *H02J 7/0014* (2013.01); *H02J 1/08* (2013.01); *H02J 7/007* (2013.01); *H02J 7/0019* (2013.01);
(Continued)

(58) Field of Classification Search
CPC .......... H02J 7/0014; H02J 1/08; H02J 7/0019; H02J 7/007; H02J 2001/008; B60L 11/1866; H02M 3/33584
See application file for complete search history.

(56) References Cited

U.S. PATENT DOCUMENTS 3,765,244 A * 10/1973 Brzezinski ............... A61B 5/01
374/168
5,504,415 A *  4/1996 Podrazhansky ....... H02J 7/0016
320/118
(Continued)

FOREIGN PATENT DOCUMENTS

EP    1662643 A2    5/2006
EP    2451043 A1    5/2012
(Continued)

OTHER PUBLICATIONS

Written Opinion and English translation thereof dated Jan. 26, 2016 in connection with International Application No. PCT/JP2015/085862.
(Continued)

*Primary Examiner* — Nha T Nguyen
(74) *Attorney, Agent, or Firm* — Wolf, Greenfield & Sacks, P.C.

(57) ABSTRACT

[Object] To provide a power control device capable of equalizing power between storage batteries in supplying direct-current power through three wires, that is, the positive electrode wire, the neutral wire, and the negative electrode wire. The storage batteries are connected in series between the positive electrode wire and the neutral wire and between the neutral wire and the negative electrode wire.
[Solution] The power control device including: a comparison unit configured to acquire a charging condition of a first battery and a charging condition of a second battery from the first battery and the second battery and to compare the
(Continued)

charging conditions with each other, the first battery being provided between a positive electrode wire to which a positive potential is applied and a neutral wire to which a ground potential is applied, the second battery being provided between the neutral wire and a negative electrode wire to which a negative potential is applied; and a power control unit configured to control power interchange between the first battery and the second battery such that the charging condition of the first battery and the charging condition of the second battery are balanced against each other on the basis of a comparison result obtained by the comparison unit.

12 Claims, 6 Drawing Sheets

(51) Int. Cl.
  *H02J 1/08* (2006.01)
  *H02J 1/00* (2006.01)
(52) U.S. Cl.
  CPC ... *H02M 3/33584* (2013.01); *H02J 2001/008* (2013.01)

(56) References Cited

U.S. PATENT DOCUMENTS

| | | | |
|---|---|---|---|
| 5,905,360 A | 5/1999 | Ukita | |
| 5,982,142 A | 11/1999 | Sullivan et al. | |
| 6,078,165 A * | 6/2000 | Ashtiani | H02J 7/0021 320/116 |
| 6,081,095 A * | 6/2000 | Tamura | B60L 11/1861 320/118 |
| 6,982,499 B1 | 1/2006 | Kachi et al. | |
| 7,825,627 B2 * | 11/2010 | Bucur | G01R 31/3658 320/116 |
| 7,893,562 B2 * | 2/2011 | Oga | H01M 10/482 307/71 |
| 8,405,349 B2 * | 3/2013 | Kikinis | H02J 7/0016 320/116 |
| 9,178,367 B2 * | 11/2015 | Nakao | H01M 10/44 |
| 2005/0151509 A1 * | 7/2005 | Cook | H02J 1/00 320/116 |
| 2005/0231217 A1 * | 10/2005 | Carruthers | G01R 27/18 324/691 |
| 2006/0103349 A1 * | 5/2006 | Yamamoto | H01M 2/1022 320/116 |
| 2010/0001737 A1 * | 1/2010 | Kubo | B60L 11/18 324/434 |
| 2011/0227537 A1 * | 9/2011 | Maleus | H02J 7/0014 320/116 |
| 2012/0200242 A1 * | 8/2012 | Grady | H02J 7/1423 318/293 |
| 2012/0212052 A1 | 8/2012 | Cyuzawa | |
| 2012/0286794 A1 * | 11/2012 | Firehammer | H01M 10/4257 324/434 |
| 2012/0293129 A1 * | 11/2012 | Naghshtabrizi | H02J 7/0016 320/118 |
| 2013/0057293 A1 * | 3/2013 | Miyamoto | G01R 31/362 324/433 |
| 2015/0019771 A1 * | 1/2015 | Greef | H01M 10/425 710/105 |
| 2015/0244189 A1 * | 8/2015 | Baba | H01M 10/4207 320/116 |
| 2016/0064969 A1 * | 3/2016 | Pernyeszi | H02J 7/0014 320/118 |
| 2016/0083220 A1 * | 3/2016 | Agirman | H02J 7/02 187/290 |
| 2016/0261127 A1 * | 9/2016 | Worry | G01R 31/3624 |
| 2016/0322672 A1 * | 11/2016 | Goetz | H01M 10/425 |
| 2017/0141586 A1 * | 5/2017 | Pernyeszi | H02J 7/007 |
| 2017/0170653 A1 * | 6/2017 | Song | H02H 7/18 |
| 2017/0250547 A1 * | 8/2017 | Menze | H02J 7/0014 |
| 2017/0346310 A1 * | 11/2017 | Wagner | H02J 7/0021 |
| 2018/0024198 A1 * | 1/2018 | Izawa | G01R 31/36 320/132 |

FOREIGN PATENT DOCUMENTS

| | | |
|---|---|---|
| EP | 2830189 A1 | 1/2015 |
| JP | 57-006542 A | 1/1982 |
| JP | 10-066267 A | 3/1998 |
| JP | 11-164494 A | 6/1999 |
| JP | 2011-205871 A | 10/2011 |
| JP | 2012-228023 A | 11/2012 |
| JP | 2013-090560 A | 5/2013 |
| WO | WO 03/059695 A1 | 7/2003 |
| WO | WO 2011-001845 A1 | 1/2011 |
| WO | WO 2012/144399 A1 | 10/2012 |

OTHER PUBLICATIONS

International Preliminary Report on Patentability and English translation thereof dated Aug. 10, 2017 in connection with International Application No. PCT/JP2015/085862.

Extended European Search Report dated Aug. 14, 2018 in connection with European Application No. 15880165.4.

International Search Report and English translation thereof dated Jan. 26, 2016 in connection with International Application No. PCT/JP2015/085862.

* cited by examiner

POWER CONTROL DEVICE, POWER CONTROL METHOD, AND POWER CONTROL SYSTEM

CROSS REFERENCE TO RELATED APPLICATIONS

This application a U.S. National Stage Entry under 35 U.S.C. § 371 of International Application No. PCT/JP2015/085862, filed in the Japanese Patent Office on Dec. 22, 2015, which claims priority to Japanese Patent Application Number JP2015-017542, filed in the Japanese Patent Office on Jan. 30, 2015, each of which is incorporated by reference herein in its entirety.

TECHNICAL FIELD

The present disclosure relates to a power control device, a power control method, and a power control system.

BACKGROUND ART

There has been known an uninterruptible power supply device provided with a storage battery is capable of supplying continuously power from the storage battery to equipment connected thereto for a predetermined time without causing power interruptions even when power from an input power source is cut off. Techniques have been developed for supplying power to customers in which such a power supply device is provided when an abnormality occurs in supplying power due to power interruption, shortage of storage battery capacity, or other reasons (see Patent Literature 1 and Patent Literature 2).

CITATION LIST

Patent Literature

Patent Literature 1: JP 2011-205871A
Patent Literature 2: JP 2013-090560A

DISCLOSURE OF INVENTION

Technical Problem

In a power supply system that supplies direct-current power, the direct-current power may be supplied through three wires, that is, a positive electrode wire to which a positive potential is applied, a negative electrode wire to which a negative potential is applied, and a neutral wire to which a ground potential is applied. In this event, there are a case where power is received through the positive electrode wire and the negative electrode wire and a case where power is received through the positive electrode wire or the negative electrode wire and the neutral wire.

In either case, however, when power supply is performed by storage batteries connected in series between the positive electrode wire and the neutral wire and between the neutral wire and the negative electrode wire, the consumption of power from only one of the storage batteries causes a difference in the remaining amounts between the storage batteries. This prevents effective supply of power.

In view of this, the present disclosure provides a novel and improved power control device, power control method, and power control system, capable of equalizing power between storage batteries in supplying direct-current power through three wires, that is, the positive electrode wire, the neutral wire, and the negative electrode wire. The storage batteries are connected in series between the positive electrode wire and the neutral wire and between the neutral wire and the negative electrode wire.

Solution to Problem

According to the present disclosure, there is provided a power control device including: a comparison unit configured to acquire a charging condition of a first battery and a charging condition of a second battery from the first battery and the second battery and to compare the charging conditions with each other, the first battery being provided between a positive electrode wire to which a positive potential is applied and a neutral wire to which a ground potential is applied, the second battery being provided between the neutral wire and a negative electrode wire to which a negative potential is applied; and a power control unit configured to control power interchange between the first battery and the second battery such that the charging condition of the first battery and the charging condition of the second battery are balanced against each other on the basis of a comparison result obtained by the comparison unit.

In addition, according to the present disclosure, there is provided a power control method including: comparing a charging condition of a first battery with a charging condition of a second battery, the first battery being provided between a positive electrode wire to which a positive potential is applied and a neutral wire to which a ground potential is applied, the second battery being provided between the neutral wire and a negative electrode wire to which a negative potential is applied; and controlling power interchange between the first battery and the second battery such that the charging condition of the first battery and the charging condition of the second battery are balanced against each other on the basis of a result of the comparison.

In addition, according to the present disclosure, there is provided a power control system including: a first battery provided between a positive electrode wire to which a positive potential is applied and a neutral wire to which a ground potential is applied; a second battery provided between the neutral wire and a negative electrode wire to which a negative potential is applied; a comparison unit configured to acquire a charging condition of the first battery and a charging condition of the second battery from the first battery and the second battery and to compare the charging conditions with each other; and a power control unit configured to control power interchange between the first battery and the second battery such that the charging condition of the first battery and the charging condition of the second battery are balanced against each other on the basis of a comparison result obtained by the comparison unit.

Advantageous Effects of Invention

According to the present disclosure as described above, it is possible to provide a novel and improved power control device, power control method, and power control system, capable of equalizing power between storage batteries in supplying power through three wires, that is, the positive electrode wire, the neutral wire, and the negative electrode wire. The storage batteries are connected in series between the positive electrode wire and the neutral wire and between the neutral wire and the negative electrode wire.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Moreover, the description will be given in the following order.
1. Embodiment of present disclosure
1.1. Overview
1.2. Configuration example
1.3. Operation example
2. Summary 1. Embodiment of Present Disclosure 1.1. Overview An overview of an embodiment of the present disclosure is described, and then the embodiment of the present disclosure is described.

It is conceivable that a mechanism in which a battery server having a storage battery is provided in each customer becomes increasingly popular in the future. In this mechanism, power generated by commercial energy or natural energy such as sunlight, wind power, and geothermal power is stored in the storage battery and the power stored in the storage battery is used to operate electrical equipment. In view of the spread of such a mechanism, when a customer has insufficient power in its battery server as described above, a system is developed in which power interchange is performed so that power is supplied from a battery server of a customer having sufficient power to a battery server of a consumer having insufficient power. In a case where customers are supplied with power to each other, the power is supplied from the storage battery, and thus the power supply by direct-current power is desirable in consideration of efficiency.

There are various direct-current power supply techniques among which a three-wire direct-current power supply tech-nique for transmitting direct-current power through three wires, that is, a positive electrode wire, a negative electrode wire, and a neutral wire has been studied. In one example, it is conceivable that there is a three-wire direct-current power supply technique in which a voltage of 100 V is applied through a positive electrode wire, a voltage of −100 V is applied through a negative electrode wire, and a voltage around 0 V is output through a neutral wire, one end of which is grounded.

In a power supply system that supplies direct-current power using such a three-wire direct-current power supply technique, the direct-current power may be supplied through three wires, that is, a positive electrode wire, a negative electrode wire, and a neutral wire. In this event, there are a case where power is received through the positive electrode wire and the negative electrode wire and a case where power is received through the positive electrode wire or the negative electrode wire and the neutral wire.

In either case, however, when power supply is performed by storage batteries connected in series between the positive electrode wire and the neutral wire and between the neutral wire and the negative electrode wire, the consumption of power from only one of the storage batteries causes a difference in the remaining amounts between the storage batteries. This prevents the storage batteries from effectively supplying power.

Further, in either case, when the storage batteries, which are connected in series between the positive electrode wire and the neutral wire and between the neutral wire and the negative electrode wire, receive power for their charging, if only one of the storage batteries is charged, a difference in the remaining amount between the storage batteries will be occurred. This prevents the storage batteries from being charged effectively.

In view of the above, those who conceived the present disclosure have conducted intensive studies to provide a technology capable of equalizing power between storage batteries in supplying power through three wires, that is, the positive electrode wire, the neutral wire, and the negative electrode wire. In this case, the storage batteries are connected in series between the positive electrode wire and the neutral wire and between the neutral wire and the negative electrode wire. Accordingly, those who conceived the present disclosure have developed the technology for comparing the charging conditions of the storage batteries connected in series between the positive electrode wire and the neutral wire and between the neutral wire and the negative electrode wire as described above. This technology allows the power to be interchanged between storage batteries so that the charging conditions of the storage batteries are balanced against each other.

The overview of an embodiment of the present disclosure is described above.

1.2. Configuration Example

Subsequently, a configuration example of a power control device and a power control system including the power control device, according to an embodiment of the present disclosure is described.

Figure 1:
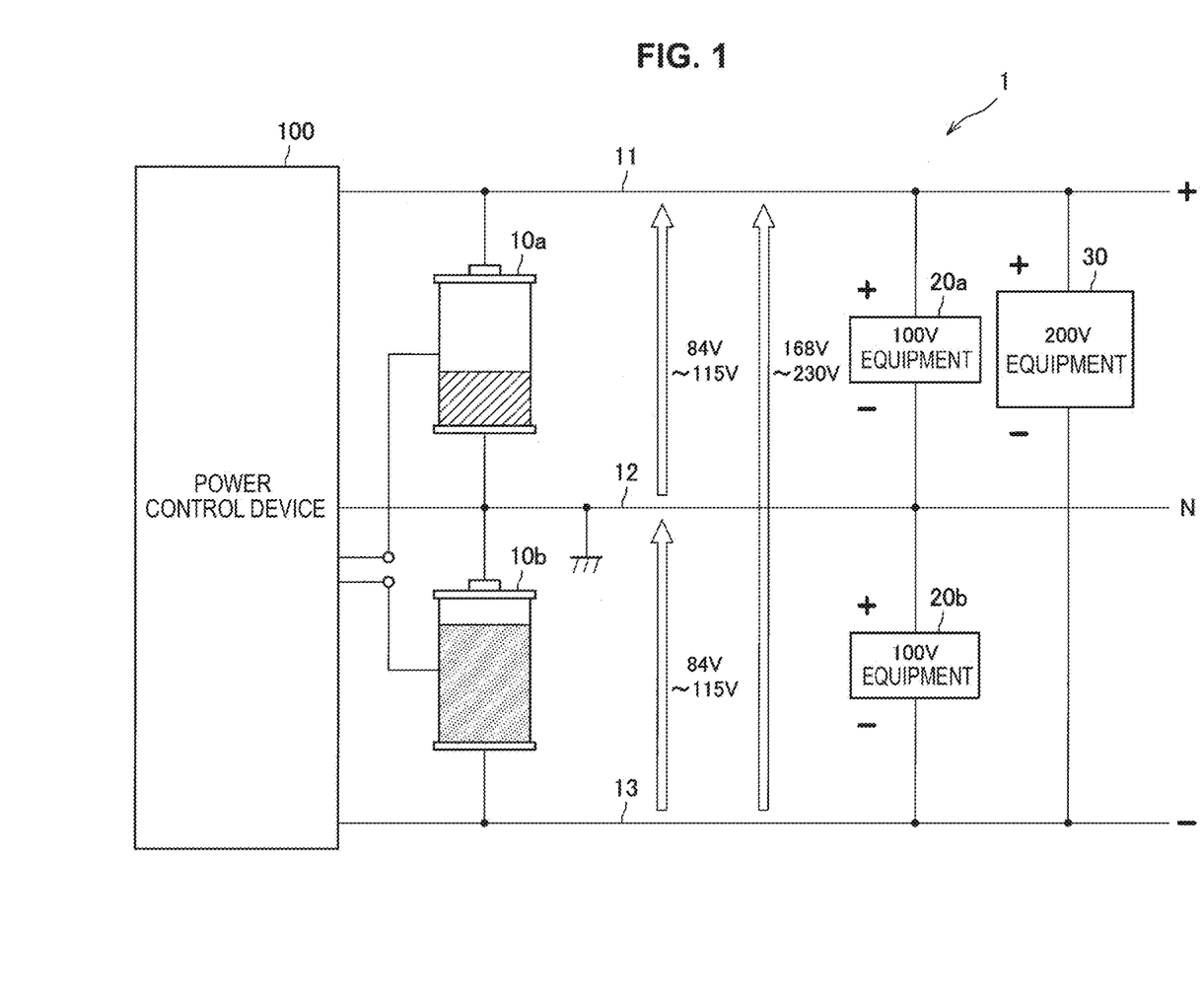
FIG. 1 is a diagram illustrated to describe a configuration example of a power control system according to an embodiment of the present disclosure.

FIG. 1 is a diagram illustrated to describe a configuration example of the power control system according to an embodiment of the present disclosure. The configuration example of the power control system according to an embodiment of the present disclosure is described below with reference to FIG. 1.

As illustrated in FIG. 1, a power control system 1 according to an embodiment of the present disclosure is configured to include battery units 10a and 10b, a positive electrode wire 11, a neutral wire 12, a negative electrode wire 13, equipment 20a, 20b, and 30, and a power control device 100. Each of the equipment 20a, 20b, and 30 may be a load that consumes power or may be a generator that generates power. In a case where each of the equipment 20a, 20b, and 30 is a generator that generate power, these generators may be a generator that generates power using natural energy such as sunlight, wind power, geothermal energy, wave energy, or other energy sources.

The battery unit 10a is connected between the positive electrode wire 11 and the neutral wire 12 as illustrated in FIG. 1. The battery unit 10a supplies direct-current power to the equipment 20a through the positive electrode wire 11 and the neutral wire 12 (in a case where the equipment 20a is a load) or receives direct-current power supplied from the equipment 20a (in a case where the equipment 20a is a generator).

The battery unit 10b is connected between the neutral wire 12 and the negative electrode wire 13 as illustrated in FIG. 1. The battery unit 10b supplies direct-current power to the equipment 20b through the neutral wire 12 and the negative electrode wire 13 (in a case where the equipment 20b is a load) or receives direct-current power supplied from the equipment 20b (in a case where the equipment 20b is a generator).

The battery units 10a and 10b are connected in series between the positive electrode wire 11 and the negative electrode wire 13 as illustrated in FIG. 1. The battery units 10a and 10b supply direct-current power to the equipment 30 through the positive electrode wire 11 and the negative electrode wire 13 (in a case where the equipment 30 is a load), or receive direct-current power supplied from the equipment 30 (in a case where the equipment 30 is a generator).

It is desirable that the capacity of the battery unit 10a is equal to or substantially equal to that of the battery unit 10b. Each of the battery units 10a and 10b outputs a charging condition to the power control device 100. The charging condition of the battery may be a state of charge (SOC) of the battery. Further, the battery units 10a and 10b may transmit the charging condition as an analog signal or as a digital signal.

The positive electrode wire 11 is an electrical wire to which a positive potential is applied. The neutral wire 12 is an electrical wire to which a ground potential is applied. The negative electrode wire 13 is an electrical wire to which a negative potential is applied. In the power control system 1 according to an embodiment of the present disclosure, the equipment is connected between the positive electrode wire 11 and the neutral wire 12, between the neutral wire 12 and the negative electrode wire 13, or between the positive electrode wire 11 and the negative electrode wire 13. Thus, the equipment can receive direct-current power supplied from the battery units 10a and 10b or supply the direct-current power to the battery units 10a and 10b.

The potential applied to the positive electrode wire 11 may vary depending on the charging condition of the battery unit 10a. Similarly, the potential applied to the negative electrode wire 13 may vary depending on the charging condition of the battery unit 10b. In the present embodiment, the potential difference between the positive electrode wire 11 and the neutral wire 12 is set to be 84 V to 115 V, and the potential difference between the neutral wire 12 and the negative electrode wire 13 is likewise set to be 84 V to 115 V. Thus, in the present embodiment, the potential difference between the positive electrode wire 11 and the negative electrode wire 13 is set to be 168 V to 230 V.

Thus, the equipment 20a connected between the positive electrode wire 11 and the neutral wire 12 and the equipment 20b connected between the neutral wire 12 and the negative electrode wire 13 are desirable to be designed so that they operate at a potential difference between 84 V and 115 V. The equipment 30 connected between the positive electrode wire 11 and the negative electrode wire 13 desirable to be designed so that it operates at a potential difference between 168 V and 230 V.

In the power control system 1 that is configured as described above, the equipment may be connected between the positive electrode wire 11 and the neutral wire 12 or between the neutral wire 12 and the negative electrode wire 13. In this case, unless consideration is given to the interchange of power between the battery units 10a and 10b, power may be output from only one of the battery units, or power may be charged to only one of the battery units. This loses the balance of the charging condition between the battery units 10a and 10b.

There may be a case where the balance of the charging condition between the battery units 10a and 10b is lost, for example, when the state of charge of the battery unit 10b is 80% and the state of charge of the battery unit 10a is 0%. In this case, the equipment connected between the positive electrode wire 11 and the neutral wire 12 will fail to receive the power from the battery unit 10a.

Further, in one example, even if the state of charge of the battery unit 10a is 0% and then the battery unit 10a is necessary to be charged, a generator connected between the neutral wire 12 and the negative electrode wire 13 fails to charge the battery unit 10a. In this case, if the state of charge of the battery unit 10b is, in one example, 100%, the generator connected between the neutral wire 12 and the negative electrode wire 13 fails to charge the battery unit 10b.

Thus, the power control system 1 according to an embodiment of the present disclosure is configured to include the power control device 100 connected to the positive electrode wire 11, the neutral wire 12, and the negative electrode wire 13. The power control device 100 according to an embodiment of the present disclosure allows the balance of the charging conditions between the battery units 10a and 10b to be maintained.

Although the specific configuration and operation of the power control device 100 according to an embodiment of the present disclosure will be described later, its operation is briefly described now. The power control device 100 according to an embodiment of the present disclosure acquires a battery charging condition from the battery units 10a and 10b. The power control device 100 according to the embodiment of the present disclosure then controls the power interchange between the battery units 10a and 10b so that power is supplied in a direction of equalizing their charging conditions on the basis of the acquired charging condition.

In one example, when the power control device 100 acquires the charging condition, if the state of charge of the battery unit 10a is 40% and the state of charge of the battery unit 10b is 60%, the power control device 100 controls so that the power may be interchanged from the battery unit 10a to the battery unit 10b. This allows the balance of the charging conditions to be maintained between the battery units 10a and 10b.

The power control device 100 according to an embodiment of the present disclosure can maintain the balance of the charging conditions between the battery units 10a and 10b. Thus, regardless of the connection type between the equipment and the positive electrode wire 11, the neutral wire 12, or the negative electrode wire 13, the equipment can receive power supplied from the battery units 10a and 10b or can transmit power to the battery units 10a and 10b.

The configuration example of the power control system according to an embodiment of the present disclosure is described above with reference to FIG. 1. Subsequently, a configuration example of the power control device according to an embodiment of the present disclosure is described.

Figure 2:
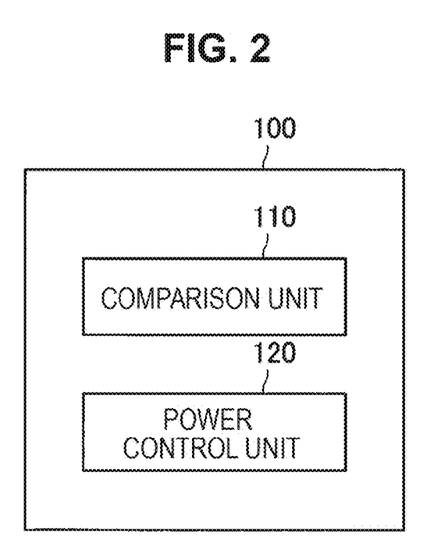
FIG. 2 is a diagram illustrated to describe a configuration example of a power control device according to an embodiment of the present disclosure.

FIG. 2 is a diagram illustrated to describe a configuration example of the power control device according to an embodiment of the present disclosure. The configuration example of the power control device according to an embodiment of the present disclosure is described below with reference to FIG. 2.

As illustrated in FIG. 2, the power control device 100 according to an embodiment of the present disclosure is configured to include a comparison unit 110 and a power control unit 120.

The comparison unit 110 acquires battery charging conditions from the battery units 10a and 10b and compares the charging conditions of the battery units 10a and 10b. Then, the comparison unit 110 sends an instruction to perform power interchange between the battery units 10a and 10b to the power control unit 120 on the basis of a result obtained by comparing the charging conditions of the battery units 10a and 10b. The comparison unit 110, when sending the instruction to perform power interchange to the power control unit 120, may output information on the amount of power that is interchanged between the battery units 10a and 10b.

The comparison unit 110 may be composed of, in one example, a comparator. In addition, in the case where the comparison unit 110 is composed of a comparator, it is desirable that predetermined hysteresis is set in the comparator.

The power control unit 120 performs power interchange between the battery units 10a and 10b in accordance with the instruction to perform power interchange between the battery units 10a and 10b sent from the comparison unit 110. This power interchange is performed on the basis of the comparison result of the charging conditions of the battery units 10a and 10b obtained by the comparison unit 110. In one example, there may be a case where the state of charge of the battery unit 10a is relatively low as the result of comparison between the charging conditions of the battery units 10a and 10b obtained by the comparison unit 110. In this case, the power control unit 120 controls so that the power is transmitted in a direction of equalizing the charging conditions, that is, the power is transmitted from the battery unit 10b to the battery units 10a.

In a case where the information on the amount of power to be interchanged between the battery units 10a and 10b is sent from the comparison unit 110, the power control unit 120 performs the power interchange between the battery units 10a and 10b until the specified amount of power is reached.

The power control unit 120 may be composed of, in one example, a bidirectional DC-DC converter. The bidirectional DC-DC converter is a circuit that converts direct-current power in two-way direction rather than one-way direction. The bidirectional DC-DC converter may be a bidirectional dual active bridge (DAB) DC-DC converter as described later. The bidirectional DAB DC-DC converter has a simple structure and has a symmetrical circuit configuration, and thus characteristics in bidirectional power transmission are equal, and it is suitable for the power interchange between the battery units 10a and 10b.

The power control device 100 according to an embodiment of the present disclosure has the configuration as illustrated in FIG. 2, and thus it is possible to maintain the balance of the charging conditions between the battery units 10a and 10b, thereby using efficiently the battery units 10a and 10b.

The configuration example of the power control device according to an embodiment of the present disclosure is described above with reference to FIG. 2. Subsequently, a specific configuration example of the power control system according to an embodiment of the present disclosure will be described.

Figure 3:
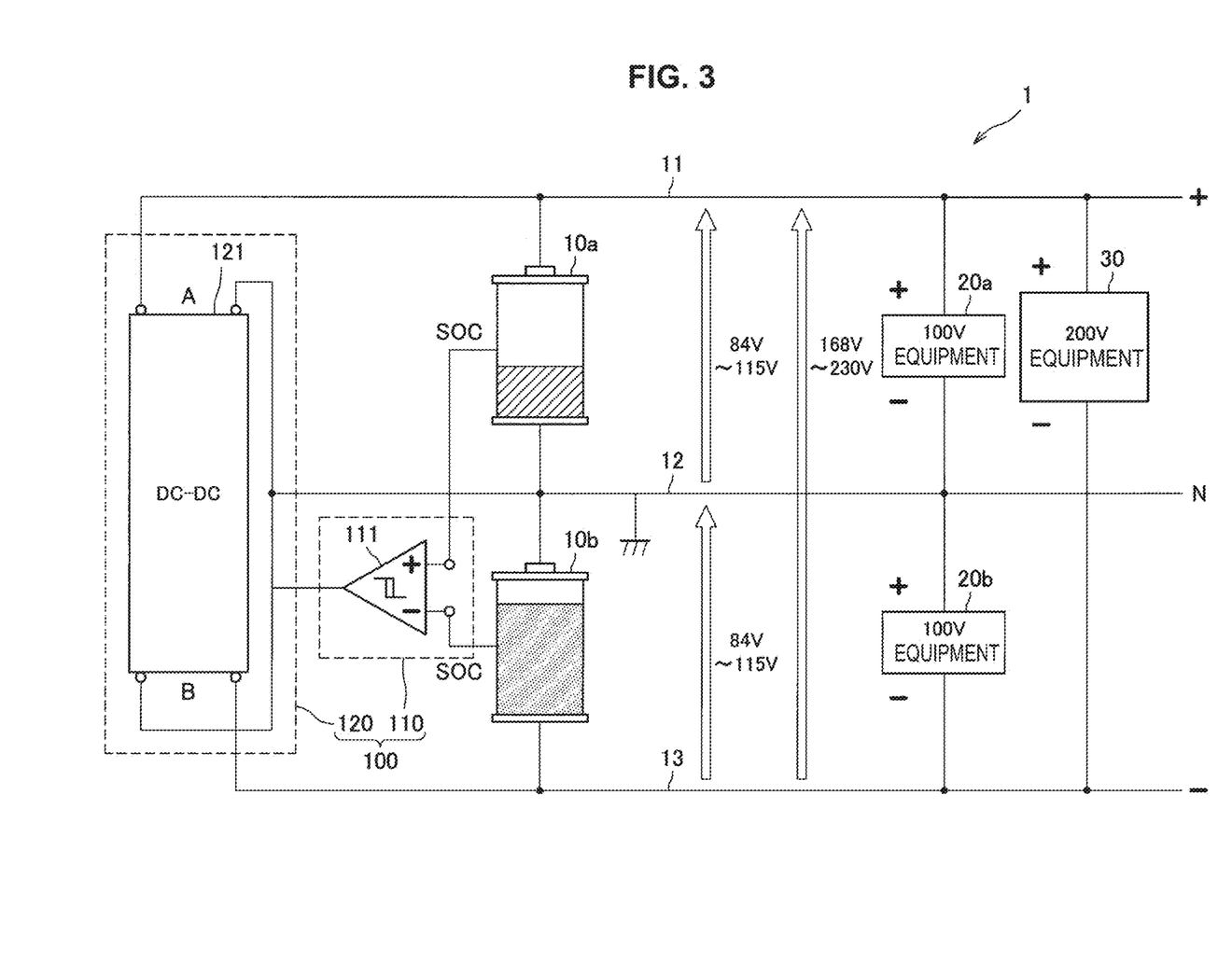
FIG. 3 illustrates a specific configuration example of the power control system according to an embodiment of the present disclosure.

FIG. 3 illustrates the specific configuration example of the power control system according to an embodiment of the present disclosure. FIG. 3 illustrates the specific configuration example of the power control system 1 in a case where a comparator 111 is used as the comparison unit 110 and a bidirectional DC-DC converter 121 is used as the power control unit 120.

The comparator 111 desirably has predetermined hysteresis as described above. In other words, in a case where the difference between the charging conditions of the battery units 10a and 10b is within a predetermined value, the comparator 111 sets the output to the bidirectional DC-DC converter 121 to 0. In a case where the difference between the charging conditions of the battery units 10a and 10b exceeds the predetermined value, the comparator 111 sets the output to the bidirectional DC-DC converter 121 to a value proportional to the difference between the charging conditions.

Figure 4:
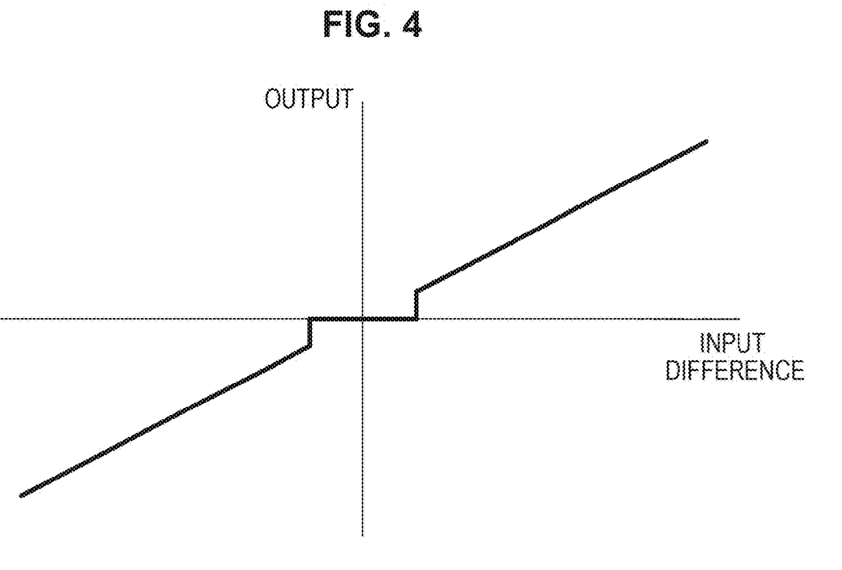
FIG. 4 is a diagram illustrated to describe an example of hysteresis characteristics of a comparator 111.

FIG. 4 is a diagram illustrated to describe an example of hysteresis characteristics of the comparator 111. In one example, it is assumed that the state of charge of the battery unit 10a is higher than the state of charge of the battery unit 10b as positive. If the difference between the state of charge of the battery unit 10a and the state of charge of the battery unit 10b is within a predetermined value, the comparator 111 sets the output to 0. If the difference between the state of charge of the battery unit 10a and the state of charge of the battery unit 10b exceeds the predetermined value, the comparator 111 outputs a value proportional to the difference.

The bidirectional DC-DC converter 121 performs the power interchange between the battery units 10a and 10b depending on the output from the comparator 111. In a case where the output from the comparator 111 is positive, it shows that the state of charge of the battery unit 10a is higher than the state of charge of the battery unit 10b. Thus, the bidirectional DC-DC converter 121 performs the power interchange from the battery unit 10a to the battery unit 10b.

Further, in a case where the output from the comparator 111 is negative, it shows that the state of charge of the battery unit 10b is higher than the state of charge of the battery unit 10a. Thus, the bidirectional DC-DC converter 121 performs the power interchange from the battery unit 10b to the battery unit 10a.

Further, in a case where the output from the comparator 111 is 0, it shows that the difference between the state of charge of the battery unit 10a and the state of charge of the battery unit 10b is within the predetermined value. Thus, the bidirectional DC-DC converter 121 is prevented from performing power interchange in either direction. In other words, in the case where the output from the comparator 111 is 0, the bidirectional DC-DC converter 121 stops its operation.

The bidirectional DC-DC converter 121 may have a function of limiting the amount of electric current to be converted depending on a value output from the comparator 111. The bidirectional DC-DC converter 121 increases the voltage at the output terminal until the amount of electric current reaches the limit value, but the maximum value of the voltage may be set so as not to exceed the maximum charge voltage of the battery units 10a and 10b. In addition, the bidirectional DC-DC converter 121 may limit the minimum discharge voltage of the battery units 10a and 10b, which are the input terminals, so as not to be lower when power is interchanged between the battery units 10a and 10b.

Figure 5:
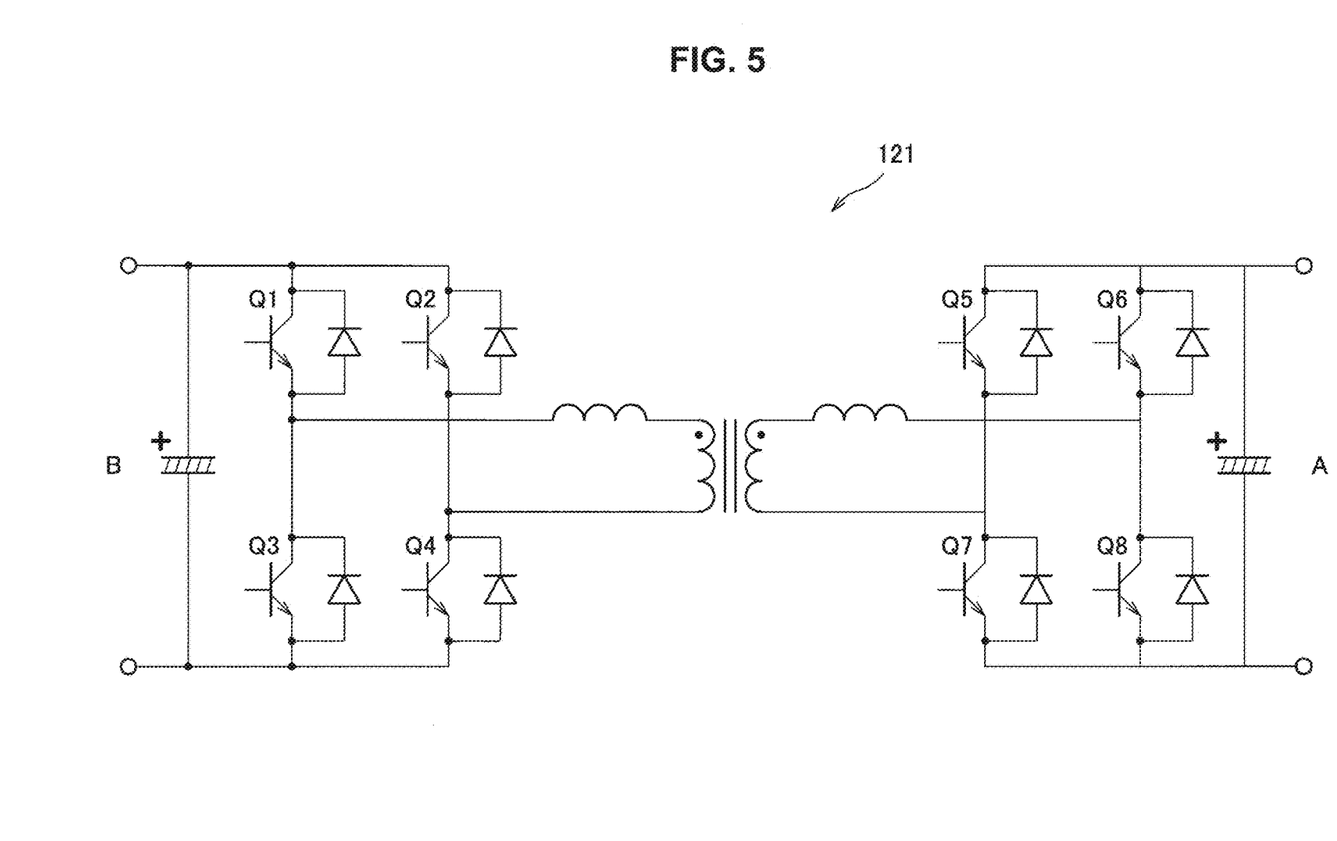
FIG. 5 is a diagram illustrated to describe an example of a bidirectional DC-DC converter 121.

FIG. 5 is a diagram illustrated to describe an example of the bidirectional DC-DC converter 121. In FIG. 5, a bidirectional DAB DC-DC converter is illustrated as the bidirectional DC-DC converter 121, but the bidirectional DC-DC converter 121 is not limited to this example. The bidirectional DC-DC converter 121 illustrated in FIG. 5 can switch between the power transmission in the direction from A to B and the power transmission in the direction from B to A by properly switching of switch elements Q1 to Q8. The switching of each of the switch elements Q1 to Q8 is controlled on the basis of the output from the comparator 111.

The power control device 100 according to an embodiment of the present disclosure has a configuration as illustrated in FIG. 3, and thus it is possible to maintain the balance of the charging conditions between the battery units 10a and 10b, thereby efficiently using the battery units 10a and 10b.

The specific configuration example of the power control system according to an embodiment of the present disclosure is described above. Subsequently, an operation example of the power control system according to an embodiment of the present disclosure is described.

1.3. Operation Example

Figure 6:
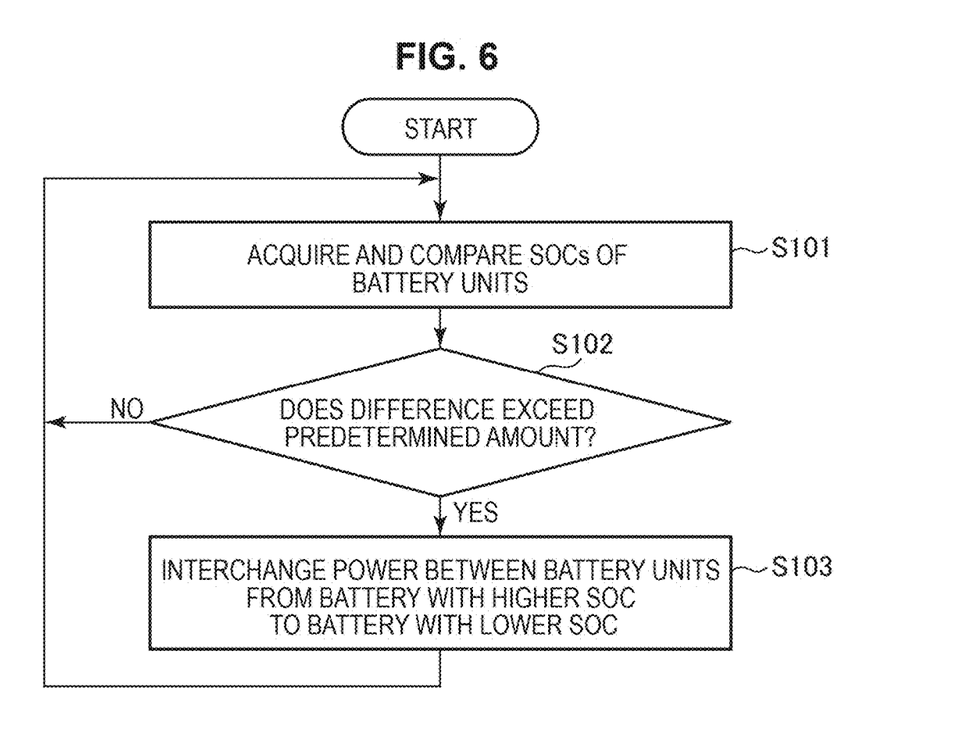
FIG. 6 is a flowchart illustrating an operation example of the power control system 1 according to an embodiment of the present disclosure.

FIG. 6 is a flowchart illustrating an operation example of the power control system 1 according to an embodiment of the present disclosure. The flowchart illustrated in FIG. 6 is an operation example of the power control system according to an embodiment of the present disclosure when power is interchanged between the battery units 10a and 10b on the basis of the charging conditions of the battery units 10a and 10b. The operation example of the power control system 1 according to an embodiment of the present disclosure is described below with reference to FIG. 6.

When power is interchanged between the battery units 10a and 10b, the power control system 1 acquires and compares SOCs of the battery units 10a and 10b (step S101). The comparison unit 110 of the power control device 100 executes the processing of step S101.

Subsequently, the power control system 1 determines whether the difference between SOCs obtained by the comparison in step S101 exceeds a predetermined amount (step S102). The comparison unit 110 of the power control device 100 executes the processing of step S102.

If the difference between SOCs is equal to or less than the predetermined amount (No in step S102) as the result of determination in step S102, the power control system 1 returns to the processing in step S101.

On the other hand, if the difference between the SOCs exceeds the predetermined amount (Yes in step S102) as the result of determination in step S102, the power control system 1 performs the power interchange so that the power is supplied from the one having higher SOC to the other having lower SOC (step S103). The power control unit 120 of the power control device 100 executes the processing of step S103.

If the processing of step S103 is completed, the power control system 1 returns to the processing of step S101 again.

The power control system 1 repeatedly executes the series of processing in FIG. 6 while the power control system 1 is operating. Moreover, the acquisition and comparison processing in step S101 can be executed at predetermined intervals.

The power control system 1 according to the embodiment of the present disclosure can maintain the balance of charging conditions between the battery units 10a and 10b by executing the series of processing as illustrated in FIG. 6, thereby efficiently using the battery units 10a and 10b.

2. Summary

According to the embodiment of the present disclosure as described above, there are provided the power control device 100 and the power control system 1 including the power control device 100. The power control device 100 and the power control system 1 allow the power to be interchanged between the battery units 10a and 10b so that the charging conditions of the battery units 10a and 10b may be balanced by comparing the charging conditions of the battery units 10a and 10b. In this case, the battery unit 10a is connected between the positive electrode wire and the neutral wire, the battery unit 10b is connected between the neutral wire and the negative electrode wire, and these battery units are connected in series.

The power control device 100 according to an embodiment of the present disclosure acquires the charging conditions of the battery units 10a and 10b and compares them. The power control device 100 allows the power to be interchanged between the battery units 10a and 10b in the direction in which the charging conditions of the battery units 10a and 10b are equalized. The power control device 100 according to an embodiment of the present disclosure allowing the power to be interchanged between the battery units 10a and 10b in the direction in which the charging conditions of the battery units 10a and 10b are equalized makes it possible to effectively use the battery units 10a and 10b.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A power control device including:

a comparison unit configured to acquire a charging condition of a first battery and a charging condition of a second battery from the first battery and the second battery and to compare the charging conditions with each other, the first battery being provided between a positive electrode wire to which a positive potential is applied and a neutral wire to which a ground potential is applied, the second battery being provided between the neutral wire and a negative electrode wire to which a negative potential is applied; and a power control unit configured to control power interchange between the first battery and the second battery such that the charging condition of the first battery and the charging condition of the second battery are balanced against each other on the basis of a comparison result obtained by the comparison unit.

(2)

The power control device according to (1), in which the comparison unit has predetermined hysteresis in comparing the charging condition of the first battery with the charging condition of the second battery.

(3)

The power control device according to (1) or (2), in which the power control unit perform the power interchange such that power is supplied from the battery with a higher state of charge to the battery with a lower state of charge by acquiring the charging condition of the first battery and the charging condition of the second battery and comparing the charging conditions with each other.

(4)

The power control device according to any of (1) to (3), in which the first battery and the second battery receive power from a generator connected between the positive electrode wire and the neutral wire or between the neutral wire and the negative electrode wire.

(5)

The power control device according to any of (1) to (4), in which the first battery and the second battery supply power to a load connected between the positive electrode wire and the neutral wire or between the neutral wire and the negative electrode wire.

(6)

The power control device according to any of (1) to (5), in which output from the comparison unit is analog output.

(7)

The power control device according to any of (1) to (5), in which output from the comparison unit is digital output.

(8)

The power control device according to any of (1) to (7), in which the comparison unit compares a state of charge of the first battery with a state of charge of the second battery.

(9)

The power control device according to any of (1) to (8), in which the power control unit limits a maximum value of an electric current to be output in performing the power interchange.

(10)

The power control device according to (9), in which the power control unit sets a maximum value of a voltage to be output in performing the power interchange to a maximum charge voltage of the first battery and the second battery.

(11)

A power control method including:

comparing a charging condition of a first battery with a charging condition of a second battery, the first battery being provided between a positive electrode wire to which a positive potential is applied and a neutral wire to which a ground potential is applied, the second battery being provided between the neutral wire and a negative electrode wire to which a negative potential is applied; and controlling power interchange between the first battery and the second battery on the basis of a result of the comparison.

(12)

A power control system including:

a first battery provided between a positive electrode wire to which a positive potential is applied and a neutral wire to which a ground potential is applied;

a second battery provided between the neutral wire and a negative electrode wire to which a negative potential is applied;

a comparison unit configured to acquire a charging condition of the first battery and a charging condition of the second battery from the first battery and the second battery and to compare the charging conditions with each other; and a power control unit configured to control power interchange between the first battery and the second battery such that the charging condition of the first battery and the charging condition of the second battery are balanced against each other on the basis of a comparison result obtained by the comparison unit.

REFERENCE SIGNS LIST 1 power control system
3 direct current
10a battery unit
10b battery unit
11 positive electrode wire
12 neutral wire
13 negative electrode wire
20a equipment
20b equipment
30 equipment
100 power control device
110 comparison unit
111 comparator
120 power control unit
121 bidirectional DC-DC converter

The invention claimed is:

1. A power control device comprising:

a comparison unit configured to acquire a charging condition of a first battery from the first battery and a charging condition of a second battery from the second battery, and to compare the charging condition of the first battery with the charging condition of the second battery, wherein the first battery is provided between a positive electrode wire to which a positive potential is applied and a neutral wire to which a ground potential is applied, and the second battery is provided between the neutral wire and a negative electrode wire to which a negative potential is applied; and a power control unit configured to control a transfer of power between the first battery and the second battery until a comparison result obtained by the comparison unit indicates that a difference between the charging condition of the first battery and a charging condition of the second battery is within a predetermined value.

2. The power control device according to claim 1, wherein the comparison unit has a predetermined hysteresis in comparing the charging condition of the first battery with the charging condition of the second battery.

3. The power control device according to claim 1,
wherein the power control unit controls the transfer of power between the first and second batteries such that power is transferred from a battery with a higher state of charge, of the first and second batteries, to a battery with a lower state of charge, of the first and second batteries, by comparing the charging condition of the first battery with the charging condition of the second battery.

4. The power control device according to claim 1,
wherein the first battery and the second battery receive power from a generator connected between the positive electrode wire and the neutral wire or between the neutral wire and the negative electrode wire.

5. The power control device according to claim 1,
wherein the first battery and the second battery supply power to a load connected between the positive electrode wire and the neutral wire or between the neutral wire and the negative electrode wire.

6. The power control device according to claim 1,
wherein an output from the comparison unit is an analog output.

7. The power control device according to claim 1,
wherein an output from the comparison unit is a digital output.

8. The power control device according to claim 1,
wherein the comparison unit compares a state of charge of the first battery with a state of charge of the second battery.

9. The power control device according to claim 1,
wherein the power control unit limits a maximum value of an electric current to be output in the transfer of power.

10. The power control device according to claim 9,
wherein the power control unit sets a maximum value of a voltage to be output in the transfer of power to a maximum charge voltage of the first battery and the second battery.

11. A power control method comprising:
comparing a charging condition of a first battery with a charging condition of a second battery, wherein the first battery is provided between a positive electrode wire to which a positive potential is applied and a neutral wire to which a ground potential is applied, and the second battery is provided between the neutral wire and a negative electrode wire to which a negative potential is applied; and
controlling a transfer of power between the first battery and the second battery until a comparison result obtained by a comparison unit indicates that a difference between the charging condition of the first battery and a charging condition of the second battery is within a predetermined value.

12. A power control system comprising:
a first battery provided between a positive electrode wire to which a positive potential is applied and a neutral wire to which a ground potential is applied;
a second battery provided between the neutral wire and a negative electrode wire to which a negative potential is applied;
a comparison unit configured to acquire a charging condition of the first battery from the first battery and a charging condition of the second battery from the second battery, and to compare the charging of the first battery with the charging condition of the second battery; and
a power control unit configured to control a transfer of power between the first battery and the second battery until a comparison result obtained by a comparison unit indicates that a difference between the charging condition of the first battery and the charging condition of the second battery is within a predetermined value.

\* \* \* \* \*